(12) United States Patent
Bernauer et al.

(10) Patent No.: US 8,367,935 B2
(45) Date of Patent: Feb. 5, 2013

(54) ELECTRICAL POWER CONNECTION DEVICE

(75) Inventors: Johann Bernauer, Tiefenbach (DE); Juergen Suttner, Marklkofen (DE)

(73) Assignee: Schott AG, Mainz (DE)

( * ) Notice: Subject to any disclaimer, the term of this patent is extended or adjusted under 35 U.S.C. 154(b) by 351 days.

(21) Appl. No.: 12/660,895

(22) Filed: Mar. 5, 2010

(65) Prior Publication Data

US 2011/0061896 A1 Mar. 17, 2011

(30) Foreign Application Priority Data

Mar. 5, 2009 (DE) .......................... 10 2009 011 277

(51) Int. Cl.
*H01B 17/26* (2006.01)
(52) U.S. Cl. .................... 174/152 R; 174/151; 174/137; 439/190; 439/191
(58) Field of Classification Search .............. 174/152 R, 174/151, 137; 439/271, 275, 190, 191, 199
See application file for complete search history.

(56) References Cited

U.S. PATENT DOCUMENTS

| | | | | |
|---|---|---|---|---|
| 2,642,474 A | * | 6/1953 | Bowar ........................... | 439/462 |
| 3,439,294 A | * | 4/1969 | Flanagan et al. ................ | 333/33 |
| 3,520,989 A | | 7/1970 | Funk et al. | |
| 3,673,546 A | * | 6/1972 | Green et al. ................... | 439/172 |
| 3,780,204 A | * | 12/1973 | Oliver et al. .................. | 174/11 R |
| 3,803,531 A | * | 4/1974 | Sorensen ....................... | 439/190 |
| 3,828,118 A | * | 8/1974 | Bushek et al. .............. | 174/11 R |
| 3,998,515 A | | 12/1976 | Panek | |
| 4,368,940 A | * | 1/1983 | Sugiura ......................... | 439/170 |
| 4,813,887 A | * | 3/1989 | Capp ............................. | 439/580 |
| 7,097,515 B2 | * | 8/2006 | Siddiqi et al. ................ | 439/700 |

FOREIGN PATENT DOCUMENTS

| | | |
|---|---|---|
| DE | 2243607 | 3/1973 |
| DE | 2315755 | 10/1973 |
| EP | 1675241 | 6/2006 |

OTHER PUBLICATIONS

Office Action dated Oct. 29, 2009 for corresponding German Patent Application No. 10 2009 011 277.4-55.
English Translation of Office Action dated Oct. 29, 2009 for corresponding German Patent Application No. 10 2009 011 277.4-55.
Office Action dated Apr. 20, 2012 corresponding to Korean Patent Application No. 10-2010-0020080 with English translation.

\* cited by examiner

*Primary Examiner* — Angel R Estrada
*Assistant Examiner* — Dimary Lopez
(74) *Attorney, Agent, or Firm* — Ohlandt, Greeley, Ruggiero & Perle, LLP (57) ABSTRACT

A power connection device, in particular for power connections of safety containers, is provided. To improve the operational safety, the power connection device includes two cascaded current feedthroughs, whereby the electrical connections between the conductors of the feedthrough are arranged in conduits of reduced volume so that the interstices between the conductors are at least partially filled.

24 Claims, 4 Drawing Sheets

ELECTRICAL POWER CONNECTION DEVICE

CROSS REFERENCE TO RELATED APPLICATIONS

This application claims benefit under 35 U.S.C. §119(a) of German Patent Application No. 10 2009 011 277.4, filed Mar. 5, 2009, the entire contents of which are incorporated herein by reference.

BACKGROUND OF THE INVENTION

1. Field of the Invention

The invention generally relates power connection devices, in particular the invention relates to electrical feedthroughs, by which high currents, particularly in the low and middle voltage range are led through or into containers.

2. Description of Related Art

In the case of containers for storing or conveying combustible dangerous goods, it is often necessary to lead high electrical power into the container. For example, submerged pumps arranged in the interior of the container are used in plants for piping and/or conveying fluidized natural gas. Connection arrangements with sealing electrical feedthroughs are used for leading the power necessary for the pumps into the interior of the container. For doing so, a feedthrough is typically flanged on a flange of the pressure container.

In particular with pressure containers of combustible gases and fluids it thereby is important that the current feedthrough stays leak-proof for a long time. Just in the case of storing combustible material, which may form explosive gas mixtures, there is additionally the risk that even in the case of very small leaks being uncritical in itself gas mixtures may be formed in closed areas of the feedthrough. Such areas may be formed in fitted protective housings. If a deflagration then takes place, the feedthroughs may be damaged such that the combustible material now leaks quickly.

BRIEF SUMMARY OF THE INVENTION

Therefore, it is the object of the invention to form an electrical feedthrough with increased operational safety, in particular for tanks or pressure containers, in particular for storing and transporting material forming explosive gas mixtures. This object is solved by the subject matter of the present application.

According to the invention, a power connection device, in particular for power connections of pressure containers is provided for doing so, the device comprising two cascaded power feedthroughs, or generally electrical feedthroughs respectively, wherein the electrical connection between the conductors of the power feedthrough are guided in conduits so that the interstices between the conductors are at least partially filled.

In more detail, the invention provides A power connection device for a container, in particular for a pressure container, including: first and second electrical feedthroughs, each having a metal flange, each having at least an opening filled for sealing by an insulation body in axial direction, in which body at least one conductor electrically insulated to the flange, and protruding from the insulation body is arranged, wherein the electrical feedthroughs have several conductors each, and wherein a conductor of the first feedthrough is each electrically contacted with a conductor of the second electrical feedthrough, and forms an electrical connection, wherein the contacted with each other conductor ends of the electrical connections are arranged in conduits, and the conduits of different electrical connections are separated from each other so that the interstices between the conductor ends of different electrical connections are at least partially filled, wherein the two current feedthroughs are sealing connected with each other so that the conduits form chambers between the insulation bodies, the chambers being sealed against the surrounding of the power connection device. Thereby, the chambers may separately be sealed, or also communicate with each other for example via conduits or other connections. In both cases, the entirety of the chambers, however, is sealed against the surrounding.

Even in case of a malfunction of one of the sealing insulating bodies of the feedthroughs, no content of the container may still escape, due to the two power feedthroughs. If, on the other hand, an insulating body of the electrical feedthrough facing the container becomes leaky, explosive gas mixtures may be formed. Particularly because an electrical discharge is possible due to the voltage applied to the conductors during operation, there is in principle the risk of a deflagration or explosion. This could damage the insulating bodies such that the power connection device becomes leaky overall.

Such a malfunction of the power connection device is thus avoided that the conductors between the feedthroughs proceed in single conduits whose individual volumes are smaller than the volume of a common chamber. Preferably, the individual chambers have a volume being as small as possible, taking the electrical and mechanical requirements into account. By doing so, the sealed volume formed in the interstice between the two feedthroughs is reduced to a minimum. Since also the amount of explosive gas in case of a leak is accordingly reduced, the pressure generated thereby is not sufficient any more for damaging the feedthroughs. Therefore, a considerably increased operational safety is achieved by the combination of the cascaded feedthroughs with conductors proceeding in conduits between the insulating bodies of the feedthroughs.

In order to be able to test the leak tightness of the power connection device, at least one testing conduit connected with the conduits from the outside is provided in an advantageous further development of the invention. Preferably, two testing conduits connected with the conduits from the outside are provided. A testing arrangement may then be connected with the one or several testing conduits, by which arrangement it is determined, whether gases from the container or from the surrounding arrived or escaped respectively into the interior of the interstice formed by the conduits between the two current feedthroughs. With containers for natural gas for example, a gas detector may be connected. Alternatively, the internal space may be flushed and rendered inert through the conduit system.

In order to ensure the functionality of a double sealing of the container by means of the two cascaded current feedthroughs, it furthermore is purposeful to provide the testing conduits with a valve, which may be opened for the purpose of testing the feedthrough. Alternatively, a permanently operational flushing or monitoring system may also be connected.

In order to further improve the capability of resistance of the current feedthroughs against the pressure occurring in case of deflagration, it is moreover advantageous, if at least with one of the two electrical feedthroughs each a conductor is arranged in a separate insulating body. Preferably, both feedthroughs are assembled in such a manner.

The conduits may also be formed as separately sealed interstices. Preferably, the conduits may communicate with each other. The latter offers the advantage that testing the leak tightness may already take place by testing at a single testing conduit.

According to a still further embodiment of the invention, at least one sleeve-shaped insulation element surrounding the conductor protruding from the insulation body, and being pressed against the insulation body is provided. The conductors are in principal electrically insulated against the metal flange of the feedthrough due to the spacing apart to the inner wall of the conduit surrounding the conductors as we as due to insulation by means of the insulation body. But the electrical insulation may considerably improved by means of the insulation elements mentioned above, and is thereby as much as possible impassible to introduced contaminations consisting of particularly conductive material. By pressing the insulation element onto the respective insulation body of the feedthrough, an intimate contact of the insulation element with the insulation body of the feedthrough is particularly achieved, also. For this reason, creepage currents between the conductor and the wall of the opening in the metal flange, in which the insulation body is arranged, may be avoided or at least inhibited. When doing so, it furthermore is of particular advantage, if the insulation element is pressed onto the insulation body or its surface by means of a spring element or by spring force respectively. Even if the spring element relaxes a little bit due to subsiding of the insulation element, a sufficient pressing force is still kept preserved. If the insulation element is only screwed in contrast, solving the screwing or a deformation or a shrinking of the insulation element could result in an at least local loss of pressing force. Generally, the insulation elements may have a knuckle or an overhanging edge, to which the spring element acts for equally distributing the pressing force along the circumferential direction of the insulation element. In particular, highly insulating plastic materials like for example PVC, silicone, or fluorinated polymers are suitable materials for these insulation elements. Particularly in case of cryogenic gases, polytetrafluorethylen (PTFE) is particularly suited.

Flat spiral springs, tension springs, disk springs, or leaf springs as well as elastomer springs come into consideration as spring elements. For example, a pressure plate may be used as leaf spring, which plate has openings, through which the sleeve-shaped insulation elements are guided. If the pressure plate is affixed to the feedthrough by means of screwings spaced apart from the insulation elements, and rest on the knuckles of the insulation elements, bending stress is applied to the plate, and the spring force generated hereby presses the insulation elements onto the insulation bodies of the electrical feedthrough.

Insulation elements affixed in such a manner are preferably used on the outer side of a feedthrough, thus the side of the flange, facing the side the other feedthrough is affixed. Preferably, insulation elements surrounding the protruding conductors are bilaterally provided on the outer sides of the electrical feedthrough.

In order to establish an efficient and space-saving insulation inside the conduits, two insulation elements each arranged in the conduits, and plugged into each other may be provided, which elements are pushed apart by a spring so that the ends of the insulation elements are pressed against facing insulation bodies of the first and the second electrical feedthroughs.

The conduits, in which the conductors proceed, may be inserted in a separate spacer piece or also internal piece between the two electrical feedthrough. According to a further embodiment of the invention, the conduits, however, are inserted in one of the metal flanges of the first or second feedthrough. By this means, a separate connecting piece is avoided, and the assembly is thereby made easier.

In order to ease assembling, also lock bush connections may particularly be provided, by which the conductors belonging to an electrical feedthrough are electrically contacted with each other, when the feedthroughs are attached to each other, or affixed. Thereby, the power connection device may be mounted in a particularly easy manner, because a laborious internal cabling can be omitted. Additionally, considerably less space is needed for the individual connections, compared with a connection by means of a lug. On the other hand, this also allows a corresponding reduction of the conduit volume, having the above mentioned advantages concerning an improved reliability in case of a deflagration of explosive gas mixtures.

Also on the outer side of the arrangement of the two electrical feedthroughs, a plug connection is advantageous which is formed when assembling. Thereto, developing the invention further provides that at least one connection flange is connected with one of the electrical feedthroughs, wherein a plug body having plug elements is arranged in the connection flange so that the plug elements are electrically contacted with the conductors of the electrical feedthroughs by attaching the feedthrough on the connection flange. Preferably, the arrangement of the two electrical feedthroughs is connected with corresponding flanges, in which plug bodies are inserted, on both sides, thus container-sided as well as connection-sided. Alternatively, the usual connection by means of lugs in a connection box is possible.

If sleeve-shaped insulation elements resting on an insulation body of a feedthrough are used for improving the electrical insulation as described above, it is then furthermore favourable, if the insulation elements overlap with the plug body in axial direction for improving the electric strength. According to further development of the invention, the sleeve-shaped insulation elements thereto extend into openings of the plug body, in which openings a plug element is arranged each.

In a preferred embodiment of the invention, the sealing insulation bodies is form as glass fusion. Highly tight and pressure resistant connections to the metal flange and to the fused in conductor may be produced by means of glass fusions. Additionally, such an insulation body has a very low porosity due to the glass structure. The glass structure avoids diffusion through the insulation body. Even after long operating time, aggregation of methane in the interstice between the insulation bodies, formed by the conduits, for example, is avoided with containers for natural gas. Alternatively, ceramic insulation bodies, however, may be used also.

In the following, the invention is described in more detail by means of exemplary embodiments and with reference to the enclosed figures. Thereby, same reference signs refer to same or corresponding elements.

DETAILED DESCRIPTION OF THE INVENTION

Figure 1:
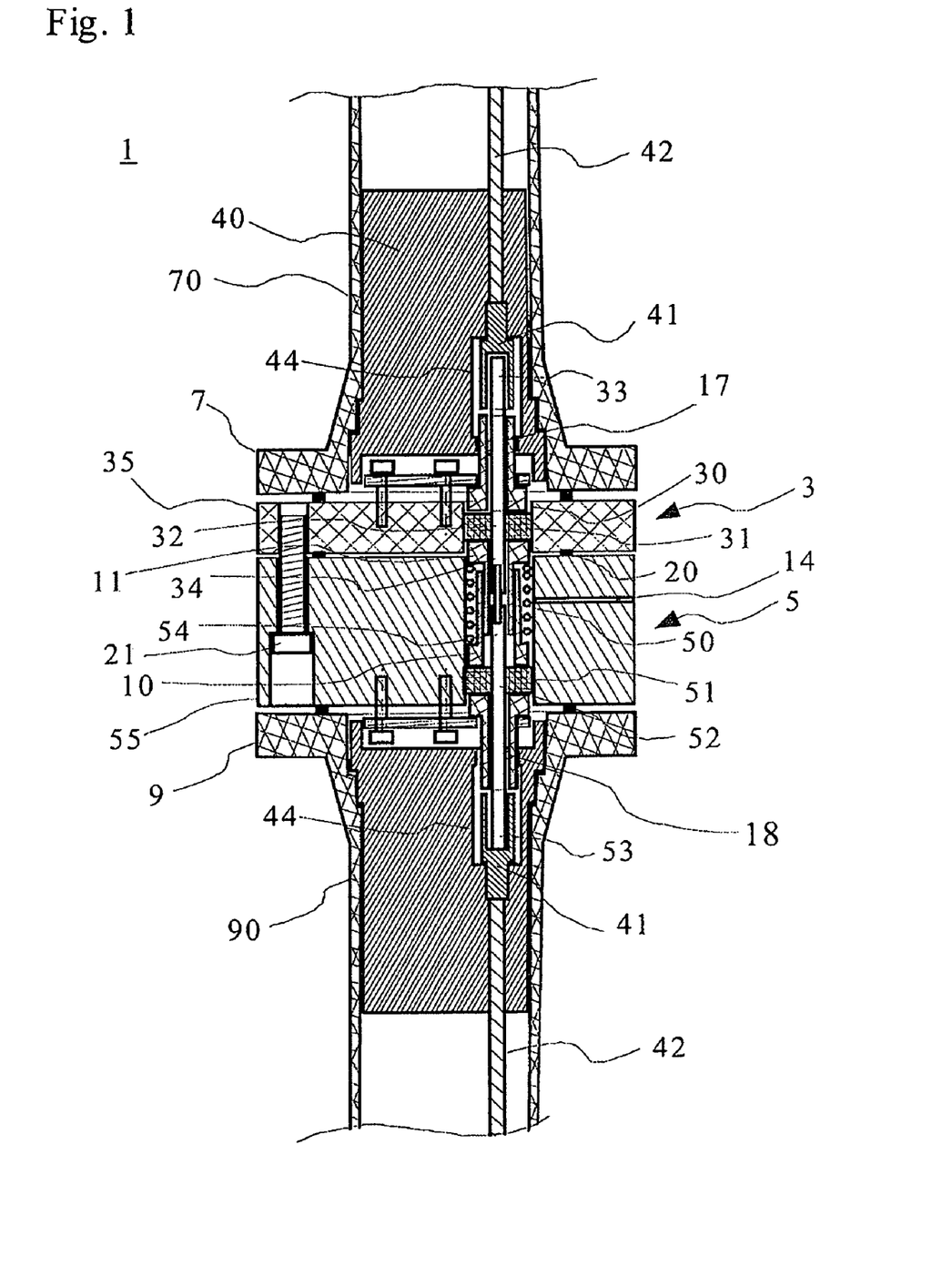
FIG. 1 is a schematic cross-sectional view through a power connection device.

A cross-sectional view of an embodiment of a power connection device according to the invention is shown in FIG. 1.

Figure 2:
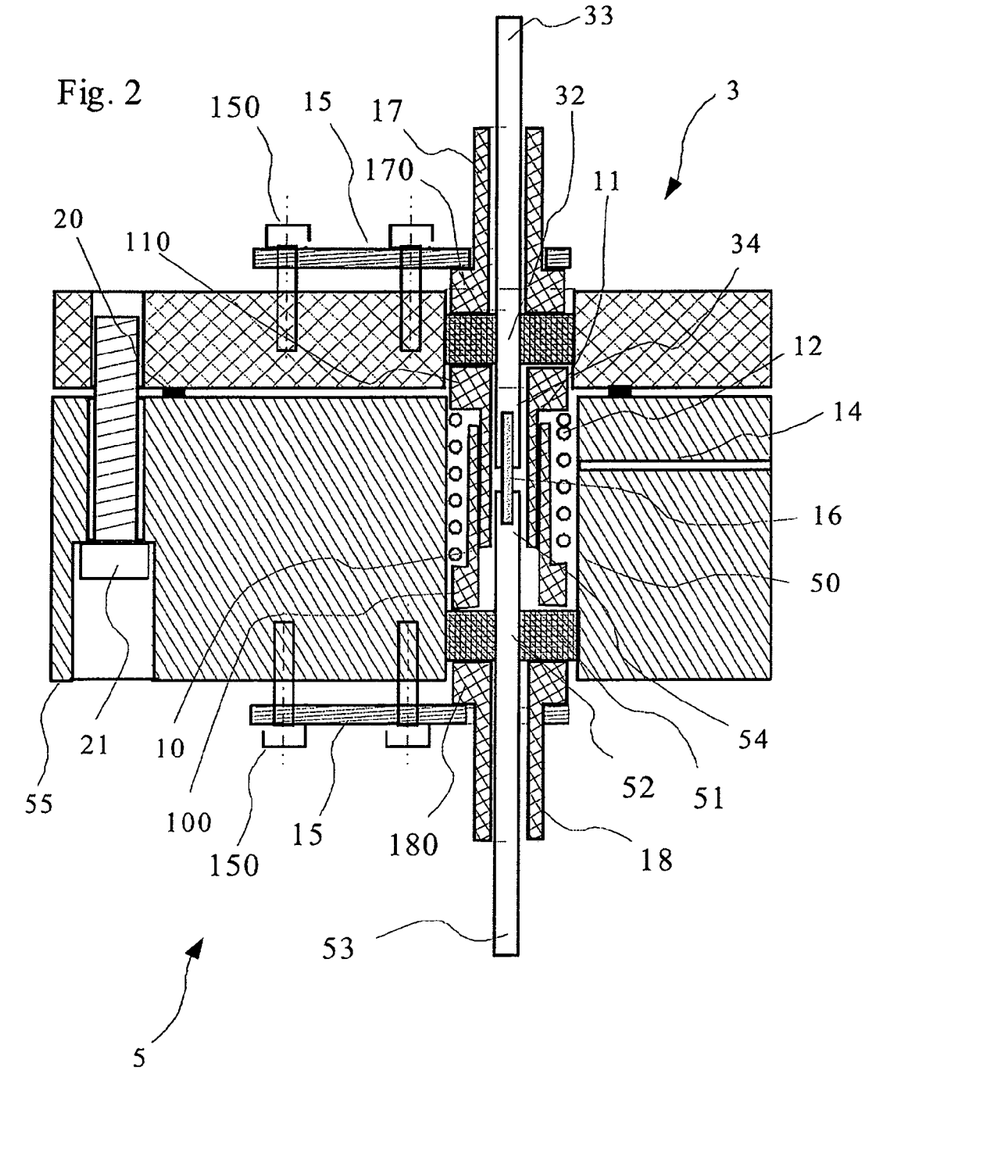
FIG. 2 is an enlarged view of electrical feedthroughs of the power connection device in FIG. 1.

FIG. 2 additionally shows details of the arrangement with the two electrical feedthroughs 3, 5 screwed together.

The power connection device 1 comprises a first electrical feedthrough 3 and a second electrical feedthrough 5 screwed together with the first electrical feedthrough 3, each having a metal flange 35 or 55 respectively. In the feedthroughs 3, 5, there are openings 30, 50 in axial direction, each sealing filled by insulation bodies 31 or 51 respectively. A conductor 32 or 52 respectively electrically insulated to the flange 35, 55 and protruding from the insulation body 31, 51 is arranged in each of the openings. The protruding ends of the conductors 32, 52 are referred to by the reference signs 33, 34 as well as 53, 54.

The electrical feedthroughs 3, 5 each have several conductors, wherein only one conductor each may be seen in the cross-sectional view of FIG. 1. For example, the power connection device may overall have three conductors for connecting a submerged being in the container, or another electrical device.

The two conductors 32, 52 are electrically contacted with each other, so forming an electrical connection 16. Thereby, the conductor end 34, 54 of the electrical connection, contacted with each other are arranged in a conduit formed by the opening 50 of the flange 55. The further electrical connections are also guided in own conduits, wherein the conduits of different electrical connections are separated from each other so that the interstice between different electrical connections is at least partially filled.

The two current feedthroughs 3, 5 are sealing connected with each other by means of a sealing inserted between the flanges 35, 55, and a screwing 21 so that the opening 50 forms a sealed chamber between the insulation body 32, 52 with respect to the surrounding of the power connection device 1. Thereby, the further, not shown openings may also communicate with the opening 50.

A testing conduit makes connecting a gas detector possible, by means of which is can be determined, whether materials arrived from the container in the interstice formed by the opening 50 through a leak in the container-sided feedthrough. Likewise, the other feedthrough may also be tested concerning tightness, for example by feeding a test gas on the outer side. If the openings communicate with each other, one single testing conduit is sufficient for testing the tightness of the whole arrangement consisting of the first and the second feedthrough 3, 5. The testing conduit is preferably provided with a valve not shown for being able to seal the opening 50 with respect to the surrounding.

Two insulation elements 10, 11 are arranged in the conduit formed by the opening 50 of the feedthrough 5. Since these elements are arranged in the sealed interior between the feedthroughs 3, 5, these insulation elements 10, 11 are also referred to as inner insulation elements. Preferably, the insulation elements are made from highly insulating and heat-resistant material. PTFE is a particularly suited material.

The insulation elements 10, 11 are formed pipe-shaped or sleeve-shaped, and have an overhanging edge 100 or 110 respectively, wherein one of the overhanging edges each rests on one of the insulation bodies 31 or 51 respectively. A spiral spring 12 is inserted under pretension, and rests with its ends on the overhanging edges 100, 110 so that spring simultaneously acts on the edges 100, 110 and presses the insulation elements 10, 11 onto the surface of the insulation bodies 31, 51 in the flanges 35, 55.

Furthermore, the insulation elements 10, 11 have different diameters so that they may be plugged into each other, and may be shifted against each other in axial direction along the conductors. Due to the overlapping of the insulation elements 10, 11 in axial direction, thereby achieved, a complete insulation is achieved.

On the outer side, thus on the sides of the flanges 35, 55 which point to the container and to the connection side of the power connection device 1, there are pipe-shaped insulation elements 17, 18 affixed, also. Spring elements are here also provided in order to firmly press the insulation elements 17, 18 at their overhanging edges 170 or 180 respectively onto the insulation bodies 31, 51 in the flanges 35, 55 of the electrical feedthroughs 3, 5.

Especially, a pressure plate 15 is here provided as spring element, which plate is affixed to the flanges 35 or 55 respectively of the electrical feedthroughs 3, 5 by means of screwings 150 spaced apart from the openings, through which the sleeve-shaped insulation elements are plugged. A bending moment is generated in the pressure plate 15 by the spaced apart screwing and the rest of the pressure plate 15 on the overhanging edge 170 or 180 respectively of the sleeve-shaped insulation elements 17, 18 so that the pressure plate 15 acts as leaf spring. Therefore, a permanent pressing force between the insulation bodies 31, 51 and the insulation elements 17, 18 is ensured in this case, also.

The electrical connection between the two protruding ends 34, 54 of the conductors 32, 52 is established by means of a lock bush connection, as it may be seen best by means of the detailed view of FIG. 2. Exemplarily, both ends 34, 54 of the conductors 32, 52, facing each other are formed as lock bushes in the example shown in FIG. 2, wherein a rod is inserted into both lock bushes.

Since the conductors 32, 52 are arranged axially aligned, the electrical connection is established simultaneously with resting the electrical feedthroughs 3, 5 onto each other during assembling.

Connection flanges 7, 9 with pipes 70,90 are flanged to the metal flanges of the feedthroughs 3, 5. One of the connection flanges 7, 9 is a connection flange of the container, while the exterior connection lines are led in through the pipe at the other at the other flange. In case of the shown exemplary embodiment, both flanges are of similar type so that the flange 7 as well as the flange 9 may principally be the container-sided flange as construction is concerned. Inter alia, the pipe at the facing flange serves as protection housing. A sealing 20, or a sealing connection is provided at least between the container-sided flange, and the feedthrough 3, 5 flanged thereon, preferably at both connection flanges 7, 9.

Plug bodies 40 with plug elements 41 are inserted into the pipes 70, 90 of the flanges 7,9, with which elements the connection cables 42 in the pipes 70, 90 are connected. The plug elements 41 are in turn formed for a lug connection for achieving a contact with the assigned conductor 32, 53 upon attaching. In case of the shown example, the plug elements 41 are lock bushes, into which the conductors 32, 52 are inserted when attaching the flanges 7, 9 or the feedthroughs 3, 5 respectively.

For improving the insulation, the sleeve-shaped insulation elements 17, 18 and the plug bodies 40 intertwine. In case of the shown example, the plug elements 41 are thereto arranged in openings 44 in the plug body, wherein the insulation elements 17, 18 extend into the openings 44.

In case of the example described above, the conduits are arranged in one of the flanges. But further configurations are still self-evidently possible, too, with which the enclosed inner volume between the two feedthroughs is essentially reduced to conduits, in which single electrical connection proceeds.

Figure 3:
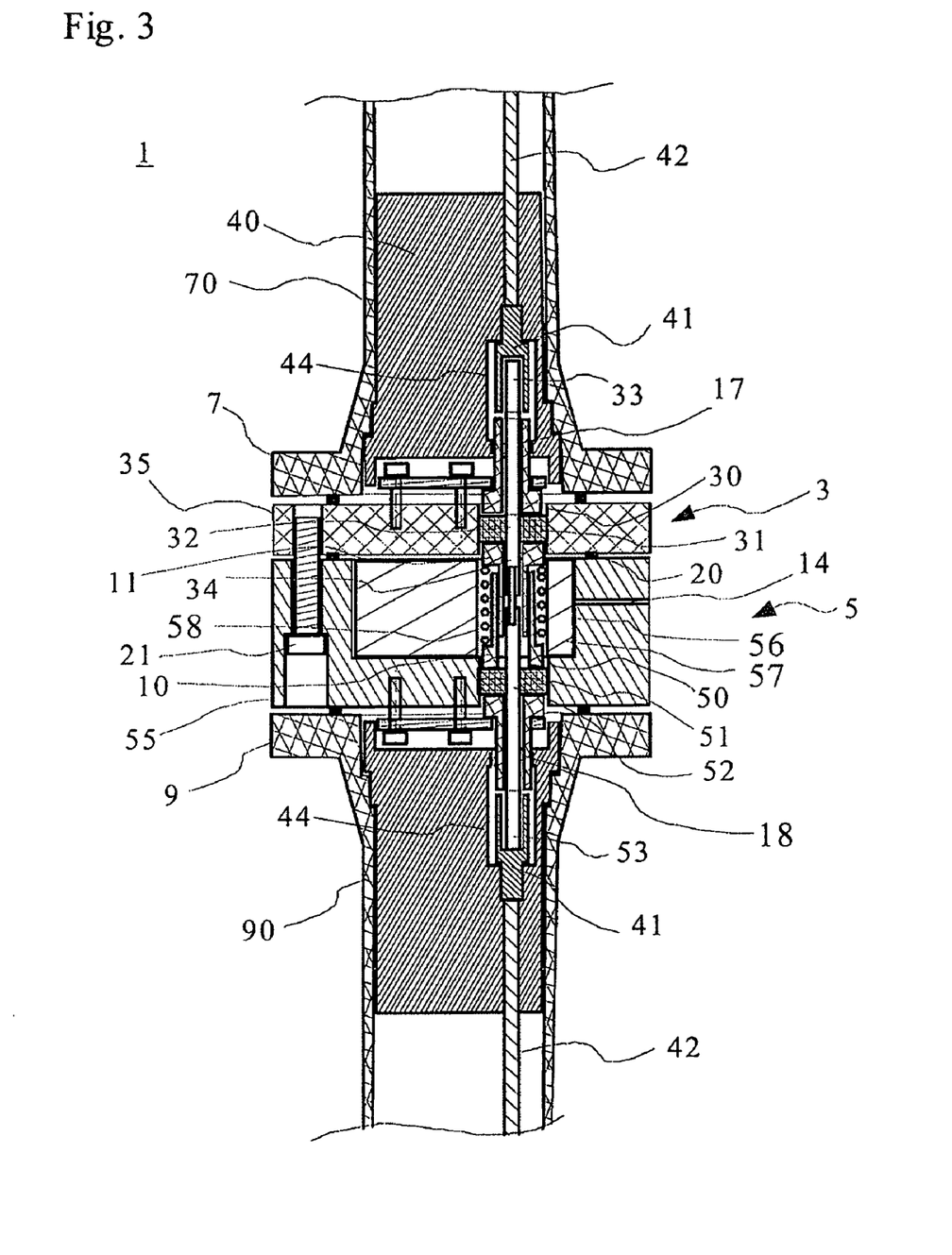
FIG. 3 illustrates a filling body having conduits of the power connection device of FIG. 1.

One possibility is a filling body with conduits, with which the inner volume between the feedthroughs is filled. FIG. 3 shows such an example. In this example, the feedthrough 5 has a cap-shaped flange. An inner volume 56 is defined by the cap-shape. This inner volume is at least partially filled by a filling body 57, wherein this filling body has separate conduits 58, in which each a single electrical connection is arranged, here again established by the conductor ends 34, 54 with lock bushes connection.

Figure 4:
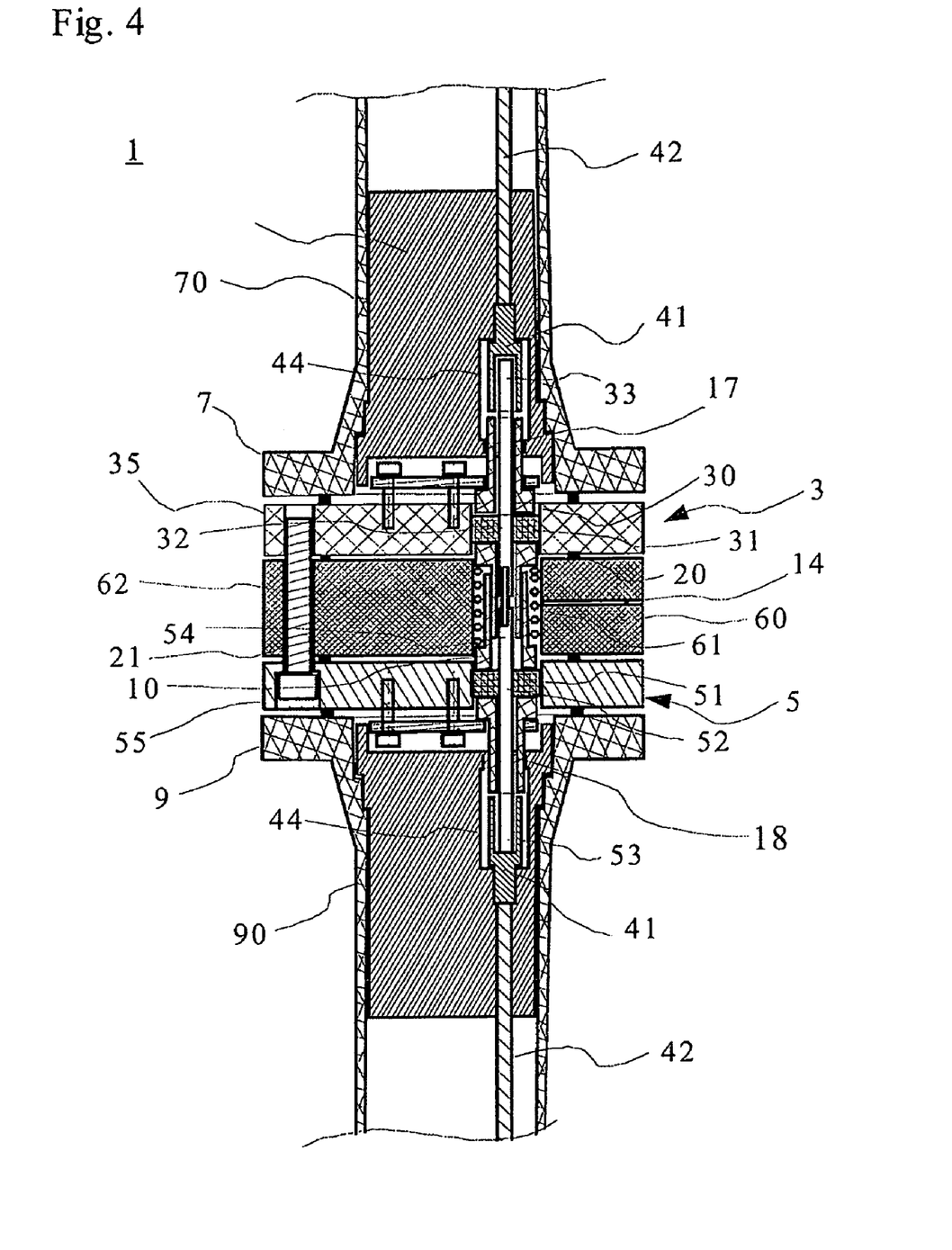
FIG. 4 illustrates spacer piece with conduits of the power connection device of FIG. 1.

In case of the examples shown so far, the two feedthroughs are furthermore directly flanged onto each other. It is possible as well to insert a spacer piece having the conduits, and which the two feedthroughs are flanged onto. FIG. 4 shows such an example. Here, a spacer piece in form of a flange is provided. Conduits 61 are inserted into the spacer piece 60 so that the interstice between the conductor ends 34, 54 of the electrical connections is at least partially filled.

For flanging the two feedthroughs 3, 5 to the interstice 60, channel bores 62 may be provided in the spacer piece 60, through which bores the screws of the screwing connection 21 are plugged. Therefore, the two feedthroughs 3,5 are simultaneously flanged to the spacer piece 60, consequently. In case of the example shown in FIG. 4, the testing conduit 14 is arranged in the spacer piece 60, too.

The example shown by means of FIG. 4 is advantageous to that effect that two identically or similarly constructed electrical feedthroughs 3, 5 may be inserted.

It is apparent to the person skilled in the art that the invention is not limited to the examples described above, but may in fact be varied in manifold ways within the scope of the claims hereinafter. In particular, the feature of the exemplary embodiments may combined with each other, as meaningful.

LIST OF REFERENCE SIGNS

1: Power connection device
3, 5: Electrical feedthrough
7, 9: Connecting flange
10, 11: Inner surface insulation elements
12: Spring
14: Testing conduit
17, 18: Outer surface insulation elements
20: Sealing
21: Screwing of 3, 5
30, 50: Openings for conductors in 3, 5
40: Plug body
41: Plug element in 40
42: Connecting cable
44: Opening in 40
31, 51: Conductor of 3, 5
33, 34: Ends of 31
35, 55: Flanges of 3, 5
56: Inner volume in 55
57: Filling body
58: Conduits in 57
60: Spacer piece
61: Conduits in 60
62: Channel bores for screwing in 60
53, 54: Ends of 51
70, 90: Pipes at 7, 9
100, 110: Overhanging edges of 10, 11
170, 180: Overhanging edges of 17,18

What is claimed is:

1. A power connection device for a pressure container, comprising:
first and second electrical feedthroughs, each having a metal flange, each having at least an opening filled for sealing by an insulation body in an axial direction, the insulation body having arranged therein at least one conductor electrically insulated to the flange and protruding from the insulation body,
wherein the first and second electrical feedthroughs have several conductors each so that conductors of the first electrical feedthrough are each electrically contacted with conductors of the second electrical feedthrough at conductor ends to form electrical connections,
wherein the contacted with each other conductor ends of the electrical connections are arranged in conduits, and the conduits of different electrical connections are separated from each other so that the interstices between the conductor ends of the different electrical connections are at least partially filled,
wherein the first and second electrical feedthroughs are sealing connected with each other so that the conduits form chambers between the insulation bodies, the chambers being sealed against the surrounding of the power connection device;
at least one sleeve-shaped insulation element being pressed against the insulation body and surrounding the conductor protruding from the insulation body; and
a spring element pressing the at least one sleeve-shaped insulation element against the insulation body.

2. The power connection device according to claim 1, further comprising at least one testing conduit from the outside connected with one of the conduits.

3. The power connection device according to claim 2, wherein the at least one testing conduit is provided with a valve.

4. The power connection device according to claim 1, where at least with one of the first and second electrical feedthroughs, the conductor is arranged in a separate insulation body.

5. The power connection device according to claim 1, wherein the conduits communicate with each other.

6. The power connection device according to claim 1, wherein the at least one sleeve-shaped insulation element has a knuckle, the spring element acting on the knuckle.

7. The power connection device according to claim 1, further comprising a pressure plate affixed to each of the first and second electrical feedthroughs by a screw spaced apart from the at least one sleeve-shaped insulation element and a bearing on a knuckle of one of the at least one sleeve-shaped insulation element so that the pressure plate is set under bending stress so that a spring force generated thereby presses the at least one sleeve-shaped insulation element onto the insulation body of the first and second electrical feedthroughs.

8. The power connection device according to claim 1, further comprising two insulation elements each arranged in the conduits, and plugged into each other, which insulation elements are pushed apart by a spring so that the ends of the insulation elements are pressed against facing insulation bodies of the first and the second electrical feedthroughs.

9. The power connection device according to claim 1, wherein the conductors of the first electrical feedthrough are each electrically contacted with conductors of the second electrical feedthrough at the conductor ends to form the electrical connections by a lock bush connection.

10. The power connection device according to claim 1, wherein the insulation body comprises a glass fusion.

11. The power connection device according to claim 1, further comprising least one connection flange connected with one of the first and second electrical feedthroughs, a plug body having plug elements being arranged in the connection flange so that the plug elements are electrically contacted with the conductors of the first and second electrical feedthrough by placing the first and second feedthroughs on the connection flange.

12. The power connection device according to claim 11, further comprising at least one a sleeve-shaped insulation element resting on the insulation body of the first or second feedthrough, the insulation element extending into an opening of the plug body, in which opening the plug element is arranged.

13. The power connection device according to claim 1, wherein the conduits are inserted in one of the metal flanges of the first or the second feedthrough.

14. The power connection device according to claim 1, further comprising a filling body having conduits with an inner volume between the feedthroughs.

15. The power connection device according to claim 1, further comprising a spacer piece having the conduits onto which the first and the second feedthroughs are flanged.

16. A power connection device for a pressure container, comprising:
   a first electrical feedthrough having a first metal flange with a first opening sealed by a first insulation body;
   a first conductor arranged in and protruding from the first insulation body, the first conductor being electrically insulated from the first metal flange;
   a second electrical feedthrough having a second metal flange with a second opening sealed by a second insulation body;
   a second conductor arranged in and protruding from the second insulation body, the second conductor being electrically insulated from the second metal flange, wherein the first conductor is electrically contacted with the second conductor to form an electrical connection in a conduit defined by the first and second openings, the first and second electrical feedthroughs being connected with one another other so that the conduit is sealed so as to form a chamber between the first and second insulation bodies;
   a testing conduit placing the conduit in fluid communication with an exterior of the power connection device; and
   a sleeve-shaped insulation element pressed against the first insulation body by a spring element, the sleeve-shaped insulation element surrounding the first conductor protruding from the first insulation body.

17. The power connection device according to the claim 16, wherein the testing conduit is defined through the first metal flange or the second metal flange.

18. The power connection device according to the claim 16, wherein the testing conduit is defined through the second metal flange.

19. The power connection device according to the claim 16, further comprising a spacer element between the first and second electrical feedthroughs, the spacer element having a third opening, wherein the conduit is defined by the first, second, and third openings, and wherein the spacer element being connected to the first and second electrical feedthroughs other so that the conduit is sealed so as to form a chamber between the first and second insulation bodies.

20. The power connection device according to the claim 19, wherein the testing conduit is defined through the spacer element.

21. A power connection device for a pressure container, comprising:
   first and second electrical feedthroughs, each having a metal flange, each having at least an opening filled for sealing by an insulation body in an axial direction, the insulation body having arranged therein at least one conductor electrically insulated to the flange and protruding from the insulation body,
   wherein the first and second electrical feedthroughs have several conductors each so that conductors of the first electrical feedthrough are each electrically contacted with conductors of the second electrical feedthrough at conductor ends to form electrical connections,
   wherein the contacted with each other conductor ends of the electrical connections are arranged in conduits, and the conduits of different electrical connections are separated from each other so that the interstices between the conductor ends of the different electrical connections are at least partially filled,
   wherein the first and second electrical feedthroughs are sealing connected with each other so that the conduits form chambers between the insulation bodies, the chambers being sealed against the surrounding of the power connection device;
   at least one sleeve-shaped insulation element being pressed against the insulation body and surrounding the conductor protruding from the insulation body; and
   a pressure plate affixed to each of the first and second electrical feedthroughs by a screw spaced apart from the at least one sleeve-shaped insulation element and a bearing on a knuckle of one of the at least one sleeve-shaped insulation element so that the pressure plate is set under bending stress so that a spring force generated thereby presses the at least one sleeve-shaped insulation element onto the insulation body of the first and second electrical feedthroughs.

22. A power connection device for a pressure container, comprising:
   first and second electrical feedthroughs, each having a metal flange, each having at least an opening filled for sealing by an insulation body in an axial direction, the insulation body having arranged therein at least one conductor electrically insulated to the flange and protruding from the insulation body,
   wherein the first and second electrical feedthroughs have several conductors each so that conductors of the first electrical feedthrough are each electrically contacted with conductors of the second electrical feedthrough at conductor ends to form electrical connections,
   wherein the contacted with each other conductor ends of the electrical connections are arranged in conduits, and the conduits of different electrical connections are separated from each other so that the interstices between the conductor ends of the different electrical connections are at least partially filled,
   wherein the first and second electrical feedthroughs are sealing connected with each other so that the conduits form chambers between the insulation bodies, the chambers being sealed against the surrounding of the power connection device;
   at least one sleeve-shaped insulation element being pressed against the insulation body and surrounding the conductor protruding from the insulation body; and
   two insulation elements each arranged in the conduits, and plugged into each other, which insulation elements are pushed apart by a spring so that the ends of the insulation elements are pressed against facing insulation bodies of the first and the second electrical feedthroughs.

23. A power connection device for a pressure container, comprising:
   a first electrical feedthrough having a first metal flange with a first opening sealed by a first insulation body;

a first conductor arranged in and protruding from the first insulation body, the first conductor being electrically insulated from the first metal flange;

a second electrical feedthrough having a second metal flange with a second opening sealed by a second insulation body;

a second conductor arranged in and protruding from the second insulation body, the second conductor being electrically insulated from the second metal flange, wherein the first conductor is electrically contacted with the second conductor to form an electrical connection in a conduit defined by the first and second openings, the first and second electrical feedthroughs being connected with one another other so that the conduit is sealed so as to form a chamber between the first and second insulation bodies;

a testing conduit placing the conduit in fluid communication with an exterior of the power connection device; and a spacer element between the first and second electrical feedthroughs, the spacer element having a third opening, wherein the conduit is defined by the first, second, and third openings, and wherein the spacer element being connected to the first and second electrical feedthroughs other so that the conduit is sealed so as to form a chamber between the first and second insulation bodies.

24. The power connection device according to the claim 23, wherein the testing conduit is defined through the spacer element.

* * * * *